Patented June 6, 1933

1,913,141

UNITED STATES PATENT OFFICE

HAROLD R. OFFORD AND GEORGE R. VAN ATTA, OF BERKELEY, CALIFORNIA

PLANT KILLER

No Drawing. Application filed July 24, 1929. Serial No. 380,743.

(GRANTED UNDER THE ACT OF MARCH 3, 1883, AS AMENDED APRIL 30, 1928; 370 O. G. 757)

This application is made under the act approved April 30, 1928, and the invention herein described, if patented, may be manufactured and used by or for the Government for governmental purposes without payment to us of any royalty thereon.

We hereby dedicate the invention herein described to the free use of the public, to take effect upon the granting of a patent to us.

This invention relates to a process and a new composition of matter for killing all manner of plants growing in promenades, alleys, public places, along roads and railways, and specifically for the killing of currants and gooseberries where they occur in wild or cultivated state.

Tests which have been carried out with this new composition of matter or chemical compound have shown that the following plants have been killed by one or all of the methods claimed:

1. *Ribes inerme* Rydb.—whitestem gooseberry.
2. *Ribes lacustre* Pers. (Poir.)—prickly gooseberry.
3. *Ribes roezli* Regel—Sierra gooseberry.
4. *Ribes nevadense* Kellogg—Sierra currant.
5. *Ribes sanguineum* Pursh—winter currant.
6. *Ribes petiolare* Dougl—western black currant.
7. *Berberis vulgaris* L.—European barberry.
8. *Alnus* species—alder.
9. *Salix* species—willow.
10. *Populus*—Carolina poplar.
11. *Taraxacum*—dandelion.
12. *Plantago*—plantain.

The essential feature of this invention consists in the use of a herbicide, formed by the solution and simultaneous chemical reaction of cuprous cyanide, in solutions containing sodium thiosulphate, known in the trade as "hypo", and water, together with other substances designed to alter the physical but not the essential chemical properties of this new composition of matter. The chemical reaction referred to above involves both the cuprous cyanide and the thiosulphate in the manner hereinafter set forth. As a specific illustration: 1 part by weight of cuprous cyanide is dissolved in 11.08 parts by weight of sodium thiosulphate penta-hydrate having the chemical composition expressed by the formula $Na_2S_2O_3.5H_2O$, which has been heated to such a temperature that fusion has taken place. If it is desirable to promote rapid solidification upon cooling, the solution is boiled for five minutes starting at a temperature of approximately 115° C., in order to remove some of the water. The fused melt is then poured into convenient sized moulds and allowed to cool and harden. The hardened substance may be crushed to any convenient size for shipping purposes.

It also is possible to prepare a solution of the new chemical composition of matter by adding cuprous cyanide to a solution of sodium thiosulphate in water at ordinary room temperatures, but under these conditions solution of the cuprous cyanide with the attendant chemical reaction involved is slow and for most purposes unsatisfactory.

If it is desirable to prepare the plant-killer in such a way that it will assume and maintain the form of a smooth paste when cooled, a substance such as glycerine is added to the hot solution prepared by the addition of cuprous cyanide to molten sodium thiosulphate in the same manner hereinbefore described. The quantity of glycerine or other substance added depends upon the relative fluidity desired in the finished product and the temperature at which it is to be kept. After the glycerine or other substance is added the material is cooled to the minimum temperature at which it is expected to be kept, being vigorously stirred during the entire time of cooling.

If it is desirable to permanently maintain the substance in the form of a solution at ordinary room temperatures, more water may be added to the original material at any step in the process, or the final product, after becoming cooled may be mixed with water and so brought into solution.

In all of the methods of manufacture described above, the essential principle involved is the same; namely, the formation of a substance by chemical combination which will, when dissolved in water, yield a new chemical compound as opposed to a physical mixture, and which when used in an appropriate manner will kill those plants known botanically as "green plants".

The specific chemical reaction involved in the formation of this plant-killer when written in what is known to chemists as the ionic form of the equation, is as follows:

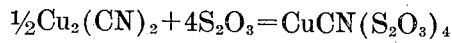
$$\tfrac{1}{2}Cu_2(CN)_2 + 4S_2O_3 = CuCN(S_2O_3)_4$$

If either the cuprous cyanide or the thiosulphate be used in relative quantity greater than that demanded by the above equation the excess over the quantity indicated will not enter into the formation of tetrathiosulphatocyanocuprite ion which is the essential feature of the new composition of matter, and which is represented by the formula $CuCN(S_2O_3)_4$.

It is possible to make water solutions of the plant-killer containing very high concentrations of copper. These solutions, if free from contamination by foreign material, are colorless. Solutions of all simple salts of copper are colored even when that element is present in very low concentration. Cuprous cyanide itself is extremely insoluble in pure water, and exists as a white powder when in its pure state. The water solutions of the plant-killer do not exhibit the chemical properties displayed by water solutions of simple copper chemical compounds. Thus, to cite only one of many examples, when iron is placed in a water solution of a simple copper compound, metallic copper will be rapidly deposited upon the surface of the iron and a chemically equivalent quantity of iron will pass into solution to take the place of the copper that has been precipitated. This process, if undisturbed, will continue until all of either the copper in solution or the iron in metallic form, or both, have been displaced from their original state. When iron is placed in a water solution of the plant-killer herein described, metallic copper is displaced from solution only at an extremely slow rate, although the concentration of copper in the solution may be very high; so that even after the solution and the iron have been in contact for a long time refined methods are necessary to detect the very small change that has taken place.

The substance in the form of either a solid mass or a paste is readily soluble in cold water and a solution of any desired strength may be employed for plant killing. Solutions containing .7 to 4.5 pounds of the substance per gallon of water represent the effective range for the killing of Ribes.

The substance is used as a spray in aqueous solution applied to the top parts of plants. It may also be used as a dust if powdered and mixed with a hygroscopic salt of the alkaline earth group. The substance is also used as a paste injected into the body of plants by means of tools, and as a water solution applied in the same fashion or upon the soil surrounding the roots of plants.

When used as a spray, either refuse black strap molasses or glucose in quantities from one to three per cent by volume or glycerine up to one per cent by volume are used as spreaders and stickers to assist in gaining complete coverage of the aerial portions of the plant with the spray solution.

The substance is non-corrosive to copper, iron, tin, Monel metal and aluminum, and only slightly so to brass and bronze.

Toxicity if taken internally by man or animals is assumed until special experiments now under way are completed.

The following is the partial explanation of the action of the substance:

The invention covers a trans-location of a heavy metal when it is present in the form of a complex ion. In the form of complex ions heavy metals are not immediately precipitated by the tannin-like bodies or by the colloidal proteins present in the conducting tissues of the plant, while the same metals when in the form of simple metallic ions are instantly precipitated by such substances and so prevented from movement and distribution through the plant body. Cuprous cyanide itself is insoluble and cannot be used. Sodium thiosulphate alone is not extremely toxic to plant life. By dissolving cuprous cyanide in sodium thiosulphate in the quantity specified a substance is formed in which the copper exists in the form of a complex ion which is distributed throughout the plant body by the plant itself, and which breaks down only very slowly after long contact with the substance present in the plant. Complete kill results.

Tests have shown that this composition of matter derived from cuprous cyanide and sodium thiosulphate will kill woody perennials with one application. Subsequent tests show that this substance is also effective on weeds and greases of the annual type.

The strengths of solutions heretofore given have been found to be efficacious and are recommended but we do not wish to be restricted to them.

We claim:

A herbicidal preparation comprising, the complex product of the reaction between one part by weight of cuprous cyanide and not less than eleven parts by weight of sodium thiosulphate, such reaction product consisting principally of sodium tetrathiosulphatocyanocuprite.

G. R. VAN ATTA.
H. R. OFFORD.